United States Patent [19]

Watson et al.

[11] Patent Number: 5,440,817
[45] Date of Patent: Aug. 15, 1995

[54] VERTICAL REFERENCE AND ATTITUDE SYSTEM

[76] Inventors: William S. Watson, 3026 Aspen Ct.; Drew A. Karnick, 3111 Wellington Drive East, both of Eau Claire, Wis. 54703

[21] Appl. No.: 64,225

[22] Filed: May 19, 1993

[51] Int. Cl.⁶ .............................. G01C 9/06
[52] U.S. Cl. ............................ 33/366; 73/1 E; 73/488
[58] Field of Search .......... 33/366, 304, 313, 365, 33/391; 73/1 E, 505; 364/559, 571.01, 709.11

[56] References Cited

U.S. PATENT DOCUMENTS

| | | | |
|---|---|---|---|
| 2,892,660 | 6/1959 | Reswick et al. | |
| 3,277,840 | 10/1966 | Li | 105/145 |
| 3,744,309 | 7/1973 | Astengo | 73/178 R |
| 3,899,028 | 8/1975 | Morris et al. | 172/4.5 |
| 3,908,455 | 9/1975 | Olson et al. | 73/167 |
| 3,959,671 | 5/1976 | Watson | 307/270 |
| 3,974,699 | 8/1976 | Morris et al. | |
| 4,021,774 | 5/1977 | Asmundsson et al. | 33/304 |
| 4,038,876 | 8/1977 | Morris | |
| 4,049,223 | 9/1977 | Watson | 244/180 |
| 4,094,073 | 6/1978 | Parra | 33/366 |
| 4,256,015 | 3/1981 | Tippetts et al. | 91/364 |
| 4,281,384 | 7/1981 | Groom et al. | 364/453 |
| 4,431,060 | 2/1984 | Scholl et al. | 172/4.5 |
| 4,458,954 | 7/1984 | Haas | 305/10 |
| 4,479,098 | 10/1984 | Watson | 331/154 |
| 4,481,901 | 12/1984 | Blasnik | 116/28.1 |
| 4,511,848 | 4/1985 | Watson | |
| 4,628,734 | 12/1986 | Watson | 73/505 |
| 4,630,685 | 12/1986 | Huck, Jr. et al. | 172/7 |
| 4,674,331 | 6/1987 | Watson | 73/505 |
| 4,839,838 | 6/1989 | LaBiche et al. | 364/709.11 |
| 4,862,172 | 8/1989 | Ross | 341/157 |
| 4,912,662 | 3/1990 | Butler et al. | 364/559 |
| 4,924,374 | 5/1990 | Middleton et al. | 364/167.01 |
| 4,949,467 | 8/1990 | Oman et al. | 33/366 |
| 4,996,878 | 3/1991 | Kübler | 73/510 |

FOREIGN PATENT DOCUMENTS 0231113 10/1991 Japan .......................... 33/366

Primary Examiner—Christopher W. Fulton
Attorney, Agent, or Firm—Moore & Hansen

[57] ABSTRACT

The present invention provides a vertical reference that includes sensors providing signals indicative of angular tilt from the predetermined reference axis and the rate of angular tilt; an integrator to integrate the angular rate signal to provide a dynamic angular tilt signal; a pendulum to provide a signal indicative of angular displacement relative to the predetermined axis; a first amplifier for filtering and amplifying the dynamic angular tilt signal and the angular displacement signal to produce a first amplified signal; a second amplifier for filtering and amplifying the dynamic angular tilt signal and the angular displacement signal to produce a second amplified signal; and a dual input amplifier for combining and amplifying the first and second amplified signals to produce an output signal indicative of vertical reference and attitude. In another embodiment of the present invention a vertical reference apparatus includes a cascaded second-order filter or control loop having a first second-order loop that receives its inputs from the pendulum and the angular rate sensor and a second second-order loop that receives as its inputs the output signal of the first loop and the angular rate sensor. The output of the second loop is provided to a control system for the structure whose orientation is desired to be measured or stabilized. In this alternative embodiment of the present invention each control loop includes a summing amplifier, a summing damped integrator, an inverting amplifier, and an integrator.

19 Claims, 5 Drawing Sheets

VERTICAL REFERENCE AND ATTITUDE SYSTEM

FIELD OF THE PRESENT INVENTION

The present invention relates in general to vertical reference and/or attitude systems, that is, to devices for providing signals indicative of vertical inclination or attitude relative to a predetermined frame or axis of reference. In particular, the present invention relates to such a device utilizing a plurality of filters providing high and low pass filtering functions to provide high and low pass inputs to a dual input filter thereby producing a full bandwidth output with a 12 dB/octave ramp up and down.

BACKGROUND OF THE PRESENT INVENTION

Vertical reference devices find use in numerous commercial and military applications. For example, they can be used to provide sensory input to the microprocessors and motors used for keeping a platform on a ship, military, commercial, or otherwise, at a predetermined orientation relative to some predetermined frame and/or axis of reference, often the gravitational vector and a plane parallel thereto. Thus, they have been used to keep decks on luxury yachts at a constant, level or non-tilting orientation relative to the horizon; to keep decks on cattle ships at the same orientation, thereby avoiding making the animals sick during ocean crossings; and to control the orientation of helipads on military ships so that the pad is not tilting with the ship as helicopters land on the pad.

Vertical reference devices utilized in such applications incorporate a variety of sensing devices whose output signals are processed to provide a signal to a microprocessor that drives one or more motors or hydraulic cylinders that are used to control the orientation of the platform. One form of such a device is shown in U.S. Pat. No. 3,974,699 to Morris. Morris utilizes linear and angular accelerometers to provide input signals to an electronic system that provides an output signal to a control system used to keep particular structures, such as a motor grader blade or a train car passenger cabin, in a predetermined orientation. Another Morris patent, U.S. Pat. No. 4,038,876, also uses linear and angular accelerometers to provide inputs signals to a control system utilized to monitor and stabilize a structural body about at least one axis. Morris notes the applicability of this device to ocean based platforms such as offshore oil drilling platforms and to stable platforms and "strapdown" situations.

Using accelerometers as Morris does, however, creates problems with a drift of the output signal. This occurs because of the dual integration that must be performed on the accelerometer signals provided by those devices before the output signal derived therefrom is provided to the appropriate control systems that are used to drive the motors and/or hydraulic devices used to stabilize the platform or other structure at the predetermined orientation. The Morris devices lack accuracy in an environment where lateral accelerations are commonplace.

Other sensors, such as angular rate sensors and liquid pendulums can be used in place of accelerometers to provide the sensory inputs used by a vertical reference to provide an output signal to a control system. In constructing such an instrument, inertial vertical accuracy response is desirable but generally unobtainable with presently known devices because of pendulum errors introduced by lateral accelerations. To improve the response curve overall, it would be better if the pendulum response had a steeper cut off slope than that provided by presently known devices, thus reducing the errors caused by lateral accelerations experienced by the vertical reference.

It would be desirable to have a vertical reference that provided an output signal that was less subject to drift due to multiple integrations of sensor signals and that produced a more accurate output or control signal under environments subject to lateral accelerations.

SUMMARY OF THE PRESENT INVENTION

It is an object of the present invention to provide new and improved apparatus that is not subject to the foregoing disadvantages of known prior art devices.

It is another object of the present invention to provide a device useful for providing an output signal indicative of vertical and attitudinal reference relative to a predetermined reference frame and/or axis.

It is still another object of the present invention to provide a vertical reference that provides a 12 dB/octave or higher frequency response.

It is yet another object of the present invention to provide a vertical reference that combines output signals from high and low pass filters by using a dual input filter system to produce a full bandwidth output over a preselected frequency range.

It is still yet another object of the present invention to provide a vertical reference that utilizes a liquid pendulum to provide a signal indicative of lateral motions of the structure of interest and that provides a sharp cutoff of the pendulum frequency response curve.

It is another object of the present invention to provide a vertical reference that provides fewer errors than the prior art devices by reducing the number of integrations performed by the apparatus by using an angular rate signal rather than an angular acceleration signal.

It is still another object of the present invention to provide a vertical reference that has a reliably flat composite curve produced by adding the outputs of high and low pass filters.

The foregoing and other objects of the present invention are provided by a vertical reference device that includes a sensor for providing an input signal indicative of angular tilt from the predetermined reference axis; a sensor for providing an input signal indicative of angular rate; an integrator to integrate the angular rate signal to provide a dynamic angular tilt signal that tracks the dynamics of the angular tilt input signal; a first amplifier for filtering and amplifying the dynamic angular tilt signal and the angular displacement signal to produce a first amplified signal; a second amplifier for filtering and amplifying the dynamic angular tilt signal and the lateral displacement signal to produce a second amplified signal; and a dual input amplifier for combining and amplifying the first and second amplified signals to produce an output signal indicative of vertical reference and attitude. The vertical reference output signal may be provided to a control unit for controlling the vertical reference and attitude of the structure to which it is mounted relative to the predetermined reference frame and/or axis.

In a preferred embodiment, the integrator is an active low pass filter and the differentiator is an active high pass filter connected in series with the active low pass filter so as to provide a cascaded filter circuit. The output of the cascaded filters are provided to the first and second amplifiers, which are connected in parallel. The first and second amplifiers each provide an amplified output signal to the dual input filter/amplifier, which combines the signals to produce an output signal indicative of vertical reference and attitude.

In an alternative embodiment to the present invention, a vertical reference apparatus may include a cascaded second-order filter or control loop having a first second-order loop that receives its inputs from the pendulum and the angular rate sensor and a second second-order loop that receives as its inputs the output signal of the first loop and the angular rate sensor. The output of the second loop is provided to a control system for the structure whose orientation is desired to be-measured or stabilized. In this alternative embodiment of the present invention each control loop includes a summing amplifier, a summing damped integrator, an inverting amplifier, and an integrator. The summing amplifier receives as its input the angular rate signal and a control signal provided by the summing damped integrator, and it provides its output to the integrator. The inverting amplifier receives as its input either the pendulum output signal (in the first loop) or the output signal of the first loop (in the second loop) and provides its output to the summing damped integrator, which as noted provides a control signal to the summing amplifier and also to a summing junction where it is summed with the signal output of the integrator. The output of the first loop is provided to the second loop, as previously stated, and the output of the second loop is the output signal of the vertical reference device.

The foregoing objects and advantages of the invention will become readily apparent to those skilled in the art as the following description is read in conjunction with the accompanying drawings. Throughout the drawings like reference numerals have been utilized to designate like elements throughout the several drawing views.

DETAILED DESCRIPTION OF THE PRESENT INVENTION

Figure 1:
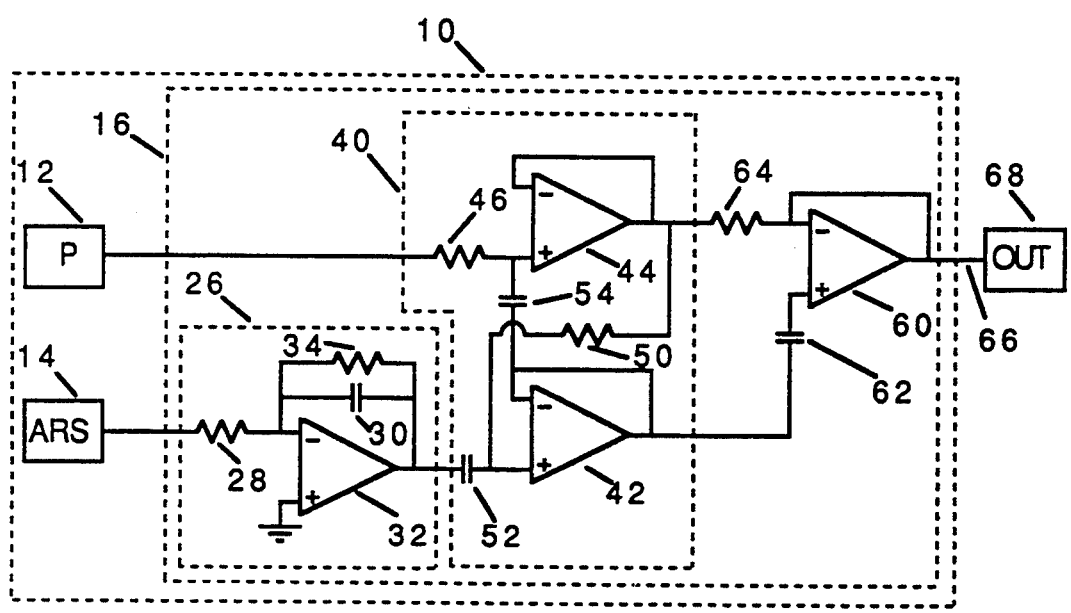
FIG. 1 illustrates in schematic form a circuit for an apparatus in accordance with the present invention that provides an output signal indicative of vertical reference and attitude.

FIG. 1 illustrates the present invention in a circuit schematic. As shown in the Figure, a vertical reference attitude device 10 includes a liquid pendulum 12 or other known means for providing an output signal indicative of angular motion of the structure (not shown) to which it is attached. Familiarity with the functioning of general vertical reference devices is presumed. For further information, reference may be made to Morris '699 and Morris '876. Device 10 further includes an angular rate sensor 14 (or, as it is sometimes referred to in the industry, a solid state rate gyroscope) that provides an output signal indicative of the rate of angular displacement of the structure relative to a predetermined axis of reference, usually the local gravitational vector as is well known in the art. Both liquid pendulum 12 and angular rate sensor 14 are devices known to the art and further explanation of their structures and functions is not deemed necessary. For a further description of these devices and an explanation of how these devices function, the reader is referred to manufacturers such as The Fredericks Company of Huntington Valley, Pa., Lucas Sensing Systems, Inc. of Phoenix, Az., or Spectron Glass and Electronics Company of Hauppage, N.Y. for a description of a liquid pendulum useful with the present invention and to C. G. Newton, "Theory and Practice in Vibratory Rate Gyros", June 1963, pp. 95–99, Control Engineering or W. S. Watson, "Vibrating Element Angular Rate Sensors for Precision Applications", March 1990, pp. 17–20, *Position Location and Navigation Symposium Record* (*IEEE*) for a description of an angular rate sensor similarly useful.

The output signal from the angular rate sensor 14 is provided to an integrator or active low pass filter circuit 26. Integrator 26 includes a resistor 28 and capacitor 30 connected to the negative or inverting input of an operational amplifier 32, the positive or noninverting input thereof being connected to ground. Integrator 26 functions to integrate the output signal of angular rate sensor 14 to provide an output signal that tracks the dynamics of the input indicating angular position (or displacement) of the reference structure. This signal has an arbitrary bias level and in practice a bias reduction system would be applied to the circuit at this stage. This bias reduction system may be an additional resistor 34 connected in parallel to the capacitor or it could be a damped integrator loop such as that shown in FIG. 12 of the aforementioned Morris '699 patent.

Filtering and amplification circuit 16 includes an interdependent filter system 40 including amplifiers 42 and 44 that act as a single filter with two inputs and two outputs. The two inputs to the filter system 40 are the output signal from pendulum 12, which is provided to interdependent filter system 40 through a resistor 46, and the output of integrator 26. Amplifier 42 gets its D.C. and low frequency response through resistor 50 at its positive input from amplifier 44 and its high frequency response from a capacitor 52 at its positive input from the integrator 26. Amplifier 44 gets its D.C. and low frequency response through a resistor 46 at its positive input and its high frequency response from a capacitor 54 at its positive input. The inputs at negative inputs of amplifiers 42 and 44 are feedback inputs used to control the amplifier gain.

The output from amplifier 44 has a frequency response in its low pass capability that ramps down at 6 dB/octave, which is insufficient to meet the desired filtering response of 12 dB/octave. The output from amplifier 42, meanwhile, has a frequency response in its high pass output that ramps down at 6 dB/octave, which is insufficient to meet the desired filtering response of 12 dB/octave. To provide the desired response, the two outputs of filter system 40 are provided to an amplifier 60, which comprises a dual input filter. Thus, the output from amplifier 42 is provided to amplifier 60 at its positive input through a capacitor 62 and the output from amplifier 44 is provided to amplifier 60 at its positive input through a resistor 64. Amplifier 60 provides an output signal over a conductor 66 to the appropriate control unit used to control the orientation of the structure to which device 10 is attached.

Figure 3:
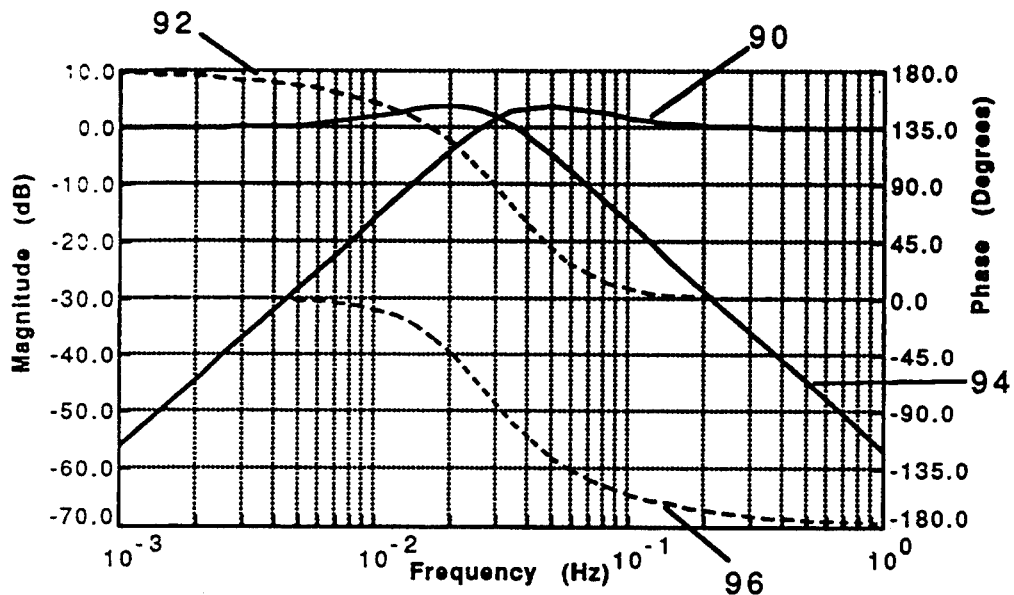
FIG. 3 shows a graph of comparing the pendulum and angular rate response produced by the present invention.
Figure 4:
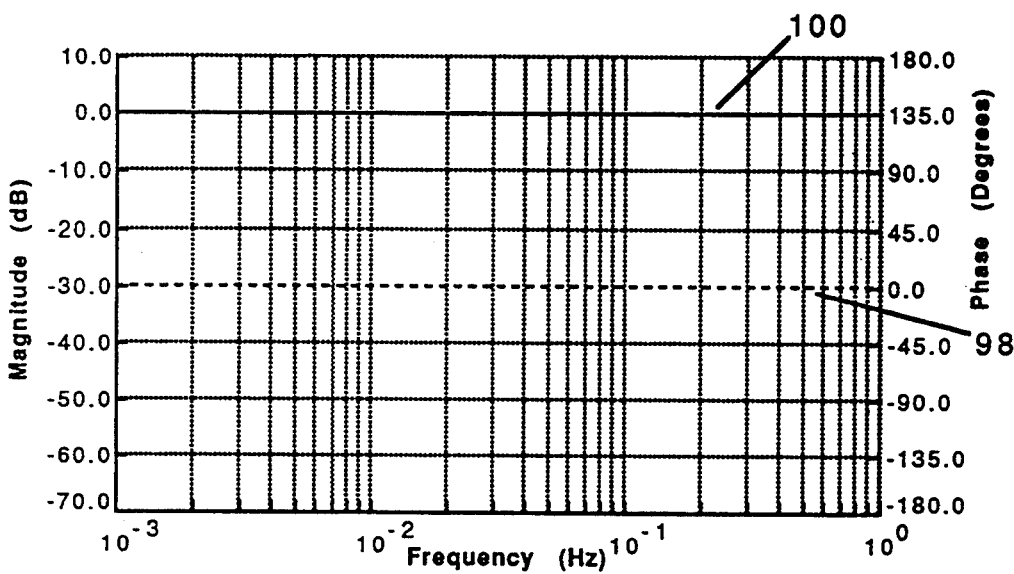
FIG. 4 shows a graph illustrating the frequency response curve produced by the present invention.

FIG. 3 shows a comparison of the frequency response produced by the present invention for the pendulum and angular rate inputs. As seen in the graph, plot line 90 represents the angular rate response to the angle magnitude input. Plot line 92 represents the phase of the angular rate response. Plot line 94 represents the pendulum response relative to the angle magnitude of the input provided by the pendulum. Plot line 96 represents the phase of the pendulum response. FIG. 4 shows the combined response of the present invention to the inputs provided by the liquid pendulum and the angular rate sensor where plot line 100 represents the magnitude of the combined signals indicating angular displacement and plot line 98 represents the phase of the combined signals. As seen by FIG. 4, the present invention provides a flat response across a significant frequency range, thereby providing better accuracy overall and particularly in situations where the structure whose position is to be stabilized is subject to lateral accelerations.

Figure 2:
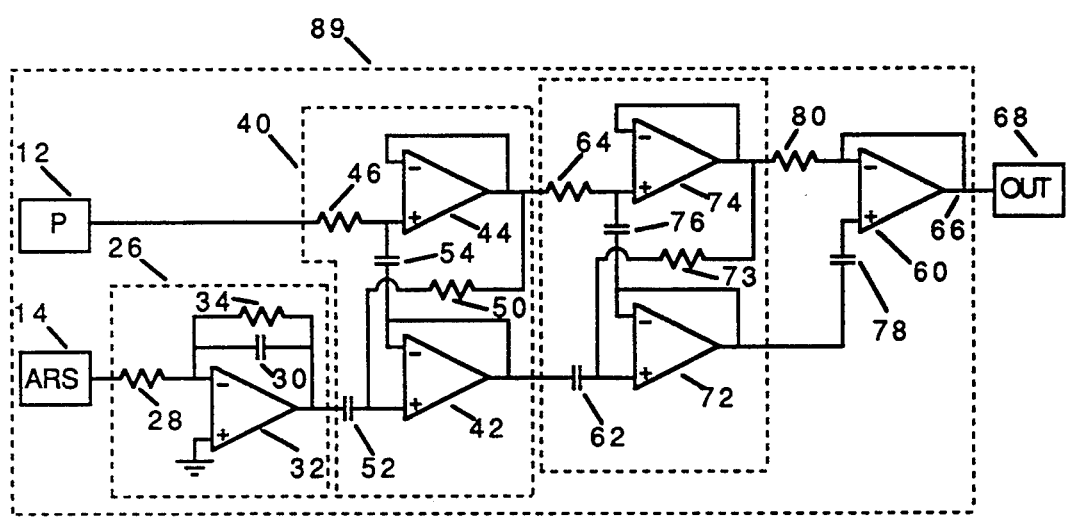
FIG. 2 shows an alternative embodiment of the present invention wherein an additional amplification loop is included to provide a steeper cutoff of the frequency response curves.

Referring now to FIG. 2, an alternate embodiment 69 of the present invention is illustrated that includes an additional amplification and filtering stage 70. In this embodiment the output from amplifier 42 is provided through capacitor 62 to an operational amplifier 72 at its positive input. An amplifier 74, meanwhile receives its input at its positive input through a capacitor 76, from amplifier 44 through resistor 64 and from the output of amplifier 72 through a resistor 73. The output of amplifier 72 is provided to amplifier 60 at its positive input through a capacitor 78 while the output of amplifier 74 is provided to amplifier 60 at its positive input through a resistor 80. Like device 10, the output of amplifier 60 is provided to an appropriate control system for controlling the orientation of the structure to which the inventive apparatus is attached. The additional filtering provided by amplification and filtering stage 70 will increase the filter roll off to nearly 18 dB/octave. Yet additional stages can be added in the manner shown in FIG. 2 as desired. However, additional filtering and amplification stages will increase the peak of the amplitude near the cross over frequency, which therefore forms the upper limit of adding additional stages.

The dual input filter system shown and described in the present application has an intrinsic flat response to angle inputs; a strong intrinsic rejection of high frequency disturbances of the liquid pendulum; and a strong intrinsic rejection of low frequency drift of the angular rate sensor. By "intrinsic", it is meant that no adjustments need to be made to achieve accurate and desired results. Preferably, (and assuming that the scale at amplifier 32 is the same as the pendulum input in degrees per volt) all of the resistors connected to amplifier 44 have the same resistance R and all of the capacitors connected to amplifier 42 have the same capacitance C, which can be shown to provide a crossover frequency $F_c = 1/(2\pi RC)$.

Figure 5:
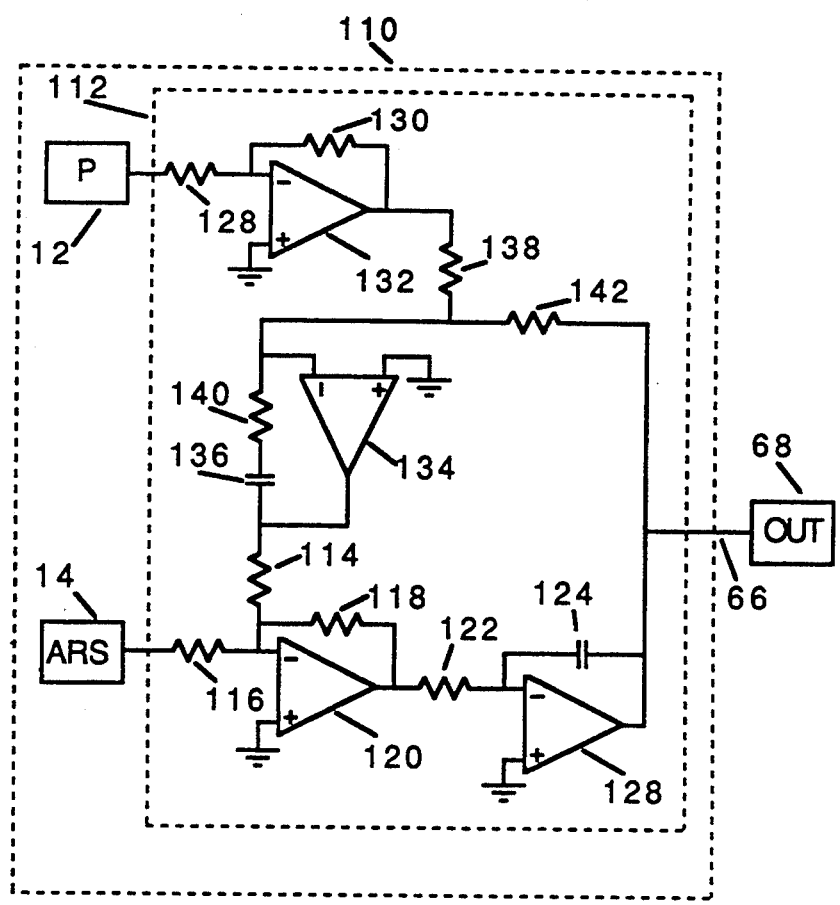
FIG. 5 shows a vertical reference apparatus including a second-order control loop.

Referring now to FIG. 5, an alternative embodiment 110 of a vertical reference is shown in a circuit schematic. FIG. 5 shows a second-order control loop which slaves the integrated angular rate to the reference pendulum. This is the same in function to FIGS. 12 and 14 of Morris '028 and '699. In this embodiment the output signals of pendulum 12 and angular rate sensor 14 are provided to a second-order control loop 112. The output signal of the angular rate sensor 14 is provided to a summing amplifier comprising resistors 114, 116, and 118 and amplifier 120. Angular rate is provided to the summing amplifier through resistor 116 and control signals are provided through resistor 114. The output signal from the summing amplifier is provided to an integrator, or active low pass filter, comprising a resistor 122, a capacitor 124 and an amplifier 126.

The pendulum signal, meanwhile, is provided to an inverting amplifier comprising resistors 128 and 130 and an amplifier 132. The inverting amplifier is used to produce a negative reference for the vertical reference system. The output of the inverting amplifier is provided in turn to a summing damped integrator comprising an amplifier 134, a capacitor 136, and resistors 138, 140, and 142. Resistors 138 and 142 balance the difference between the pendulum and the output of amplifier 126 and passes the error on to amplifier 134. The loop formed by amplifiers 120, 126, and 134 converges the output of amplifier 126 to equal the pendulum output over a time constant set by the integrator time constants. Damping of this convergence is set by resistor 140 to minimize ringing and to optimize control, usually critically damped. The output of second-order control loop 112 is provided to control means 68 over conductor 66 as previously described.

Vertical reference 110 provides a signal output that has less dynamic errors than the signal output provided by the pendulum alone yet maintains the dynamic response of the angular rate sensor. The performance of the vertical reference 110 could be improved, however, by using a better reference than the signal provided by the pendulum.

Figure 6:
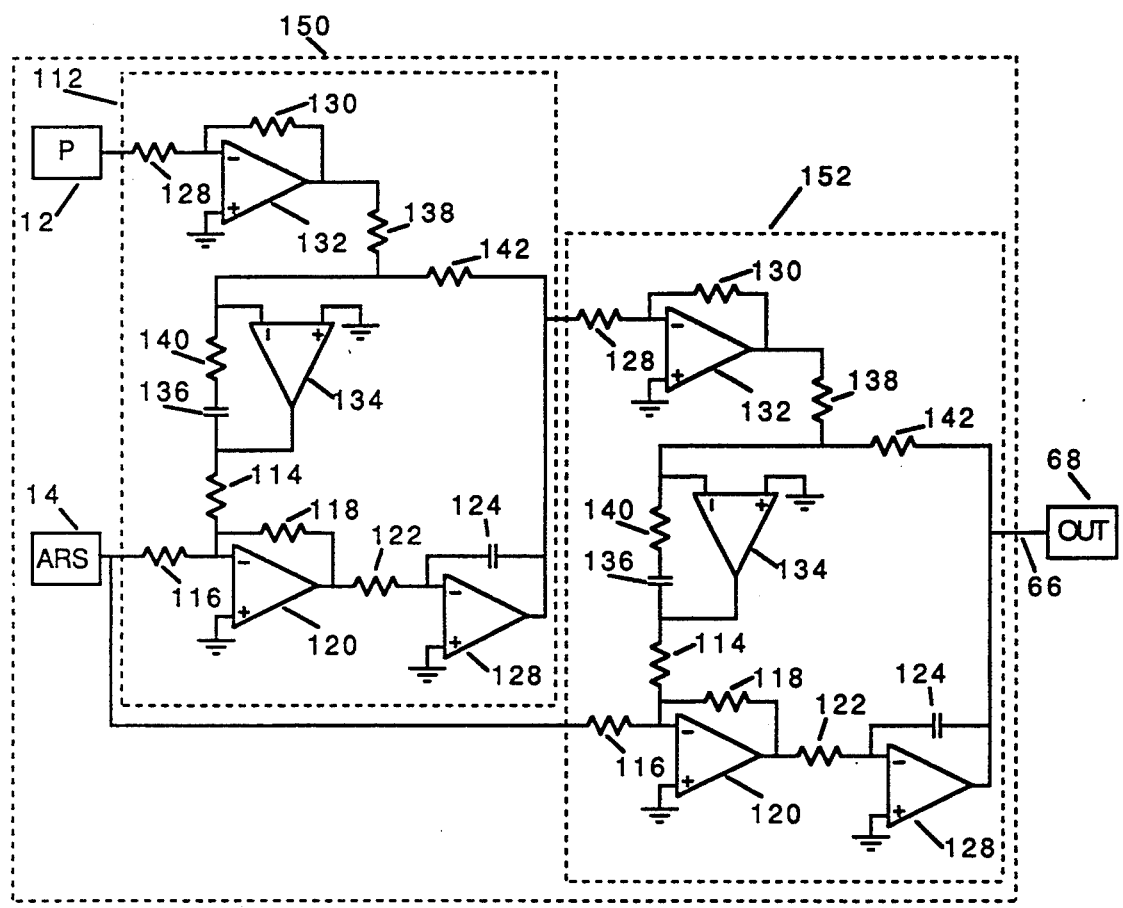
FIG. 6 shows an alternative embodiment of the vertical reference shown in FIG. 5 wherein a second second-order control loop is provided such that the desired frequency response shown in FIG. 4 can be achieved.

Referring now to FIG. 6, another alternative embodiment of the present invention is shown wherein a second-order control loop is cascaded with the first loop so that the first loop becomes the reference for the second loop. Thus, a vertical reference 150 is illustrated and includes a second control loop 152 that receives as its input the output from the first control loop 112 and a signal from the angular rate sensor 14. The output signal from the second-order control loop 112 is provided to the inverting amplifier of the second second-order control loop 152, which comprises as noted, a resistor 128, a capacitor 130 and an amplifier 132. The angular rate sensor signal is provided to the summing amplifier of the second second-order control loop 152. This summing amplifier comprises resistors 114, 116, and 118, and amplifier 120.

The performance of the vertical reference 150 is also shown by FIGS. 3 and 4, just as with the four pole dual input filter system. The vertical reference 150 shown in FIGS. 6 therefore provides the same desired response as the vertical reference 69 of FIG. 2.

The present invention, in any of the embodiments described herein, provides an improved apparatus and method of rejecting pendulum disturbances and angular rate sensor (solid state rate gyro) biases in a vertical reference system while maintaining a flat composite response curve.

The present invention having thus been described, other modifications, alterations, or substitutions may now suggest themselves to those skilled in the art, all of which are within the spirit and scope of the present invention. For example, using angular rate as a sensor input is best for limiting signal drift, but an angular accelerometer as a dynamic input would also work if an additional integration stage were added to the circuit. In addition, a pendulum provides the best static input for purposes of linearity, but a linear accelerometer could also be used for low ranges or at high ranges with a linearity correction. It is therefore intended that the present invention be limited only by the scope of the claims that follow below.

We claim:

1. A vertical reference apparatus, said apparatus being configured for mounting to a structure whose orientation relative to a predetermined reference axis is desired to be stabilized or measured, said apparatus including:
    means for providing a signal indicative of angular rate relative to the predetermined axis;
    means for integrating said angular rate signal to provide a dynamic angular tilt signal;
    means for providing a signal indicative of angle displacement relative to the predetermined axis;
    first filtering and amplifier means for filtering and amplifying said dynamic angular tilt signal and said angle displacement signal to produce a first amplified signal;
    second filtering and amplifier means for filtering and amplifying said dynamic angular tilt signal and said first amplified signal to produce a second amplified signal; and
    means for combining and amplifying said first and second amplified signals to produce an output signal indicative of vertical reference and attitude
wherein said output signal is provided to control means for controlling the vertical reference and attitude of the structure relative to the predetermined reference axis.

2. The apparatus of claim 1 wherein said means for integrating comprises an active low pass filter.

3. The apparatus of claim I wherein said means for providing a signal indicative of angular rate comprises a solid state rate gyroscope.

4. The apparatus of claim 3 wherein said means for providing a signal indicative of angle displacement comprises a liquid pendulum.

5. The apparatus of claim 1 wherein said means for providing a signal indicative of angle displacement comprises a liquid pendulum.

6. The apparatus of claim 1 and further including a resistor for said first amplifier means and a capacitor for said first amplifier means and wherein said first amplifier means is an operational amplifier having inverting and noninverting inputs, said operational amplifier receiving a D.C. and low frequency response through said resistor at its noninverting input from said second amplifier means and its high frequency response from said capacitor at said noninverting input from said means for integrating.

7. The apparatus of claim 6 and further including a resistor for said second amplifier means and a capacitor for said second amplifier means and wherein said second amplifier means is a second operational amplifier having inverting and noninverting inputs, said second operational amplifier receiving a D.C. and low frequency response through said resistor at its noninverting input and a high frequency response from said capacitor at its noninverting input.

8. The apparatus of claim 1 and further including a resistor for said second amplifier means and a capacitor for said second amplifier means and wherein said second amplifier means is a second operational amplifier having inverting and noninverting inputs, said second operational amplifier receiving a D.C. and low frequency response through said resistor at its noninverting input and a high frequency response from said capacitor at its noninverting input.

9. The apparatus of claim 1 wherein:
    said first and second amplifier means comprise a first amplification loop and wherein said apparatus further comprises n such amplification loops where n is a whole number and $n>1$;
    the outputs of the mth amplification loop are received by the $m+1$ amplification loop, where m is a whole number and $0<m<n$; and
    the outputs of the nth amplification loop are provided to said means for combining and amplifying.

10. A vertical reference apparatus for providing a signal indicative of the orientation of a structure relative to a predetermined reference axis, said apparatus comprising:
    means for providing a signal indicative of angular tilt relative to the predetermined reference axis;
    means for providing a signal indicative of angular rate relative to the predetermined reference axis;
    a first second-order control loop, said first loop receiving as its inputs the signals indicative of angular tilt and angular rate relative to the predetermined reference axis, wherein said first second-order loop includes:
    a summing amplifier;
    a summing damped integrator;
    an inverting amplifier; and
    an integrator,
    wherein:
    said summing amplifier receives as its input the angular rate signal and a control signal provided by said summing damped integrator, said summing amplifier providing an output signal to said integrator;
    said inverting amplifier receives as its input the signal indicative of angular tilt relative to the predetermined reference axis and provides an output signal to said summing damped integrator; and
    said summing damped integrator provides a control signal to said summing amplifier and an output signal to a summing junction where it is summed with the signal output of said integrator to produce a first loop output signal, said first loop providing a dynamic output signal indicative of the orientation of the structure relative to the predetermined reference axis;
    a second second-order control loop, said second loop receiving as its inputs the output signal from said first loop and the signal indicative of angular rate relative to the predetermined reference axis, wherein said second second-order loop includes:
    a second loop summing amplifier;
    a second loop summing damped integrator;
    an second loop inverting amplifier; and
    an second loop integrator,
    wherein:
    said second loop summing amplifier receives as its input the angular rate signal and a control signal provided by said second loop summing damped integrator, said second loop summing amplifier providing an output signal to said second loop integrator;.

said second loop inverting amplifier receives as its input the output signal of said first second-order loop and provides an output signal to said second loop summing damped. integrator; and said second loop summing damped integrator provides a control signal to said second loop summing amplifier and an output signal to a second loop summing junction where it is summed with the signal output of the second loop integrator to produce a second loop output signal, said second loop providing a dynamic output signal indicative of the orientation of the structure relative to the predetermined reference axis, wherein said output signal of said second loop provides a flat frequency response.

11. The apparatus of claim 10 wherein:

said apparatus includes n second-order control loops where n is a whole number and n>1;

the output of the mth second-order control loop is received by the m+1 second-order control loop, where m is a whole number and 0<m<n;

the output of said means for providing a signal indicative of angular rate relative to the predetermined reference axis is provided to each said second-order control loop; and the outputs of the nth second-order control loop is provided to a control means.

12. The apparatus of claim 10 wherein said integrator each comprise an amplifier having positive and negative inputs, said positive input being connected to ground and said negative input receiving a signal from said summing amplifier through a resistor, said integrator further including a capacitor connected between the output of the amplifier and the negative input of said amplifier.

13. The apparatus of claim 10 wherein said inverting amplifiers comprise an amplifier having a positive input connected to ground, a negative input receiving a signal from said means for providing a signal indicative of angular tilt relative to the predetermined reference axis through a first resistor, and a second resistor connected between the output of said amplifier and said negative input of said amplifier.

14. The apparatus of claim 10 wherein said summing amplifiers comprise first, second, and third resistors and an amplifier having a positive input connected to ground, said negative input receiving a signal from said means for providing a signal indicative of angular rate relative to the predetermined reference axis through said first resistor and a signal from said summing damped integrator through said second resistor, said third resistor being connected between the output of said amplifier and said negative input thereof.

15. The apparatus of claim 10 wherein said summing damped integrator comprise an amplifier, a capacitor, and first, second and third resistors; wherein said capacitor and said third resistor are connected between the output and the negative input of said amplifier, the positive input of said amplifier being connected to ground and wherein said summing damped integrator receives an input signal from said inverting amplifier through said first resistor which provides a signal to said second resistor and said amplifier.

16. A vertical reference apparatus for providing a signal indicative of the orientation of a structure relative to a predetermined reference axis, said apparatus comprising:

means for providing a signal indicative of angular tilt relative to the predetermined reference axis;

means for providing a signal indicative of angular rate relative to the predetermined reference axis;

a first second-order control loop, said first loop receiving as its inputs the signals indicative of angular tilt and angular rate relative to the predetermined reference axis, wherein said first second-order loop includes:

a summing amplifier;

a summing damped integrator;

an inverting amplifier; and an integrator, wherein:

said summing amplifier receives as its input the angular rate signal and a control signal provided by said summing damped integrator, said summing amplifier providing an output signal to said integrator;

said inverting amplifier receives as its input the signal indicative of angular tilt relative to the predetermined reference axis and provides an output signal to said summing damped integrator; and said summing damped integrator provides a control signal to said summing amplifier and an output signal to a summing junction where it is summed with the signal output of said integrator to produce a first loop output signal, said first loop providing a dynamic output signal indicative of the orientation of the structure relative to the predetermined reference axis.

17. The apparatus of claim 16 wherein:

said apparatus includes n second-order control loops where n is a whole number and n>1;

the output of the mth second-order control loop is received by the m+1 second-order control loop, where m is a whole number and 0<m<n;

the output of said means for providing a signal indicative of angular rate relative to the predetermined reference axis is provided to each said second-order control loop; and the outputs of the nth second-order control loop is provided to a control means.

18. A vertical reference apparatus, said apparatus being configured for mounting to a structure whose orientation relative to a predetermined reference axis is desired to be stabilized or measured, said apparatus including:

means for providing a signal indicative of angular rate relative to the predetermined axis;

means for integrating said angular rate signal to provide a dynamic angular tilt signal;

means for providing a signal indicative of angle displacement relative to the predetermined axis; and at least one amplification loop comprising:

first filtering and amplifier means for filtering and amplifying said dynamic angular tilt signal and said angle displacement signal to produce a first amplified signal, said apparatus further including a first amplifier means resistor and a first amplifier means capacitor and wherein said first amplifier means is an operational amplifier having inverting and noninverting inputs, said operational amplifier receiving a D.C. and low frequency response through said first amplifier means resistor at its noninverting input from said second amplifier means and its high frequency response from said first amplifier means capacitor at said noninverting input from said means for integrating;

second filtering and amplifier means for filtering and amplifying said dynamic angular tilt signal and said first amplified signal to produce a second amplified signal, said apparatus further including a second amplifier means resistor and a second amplifier means capacitor and wherein said second amplifier means is a second operational amplifier having inverting and noninverting inputs, said second operational amplifier receiving a D.C. and low frequency response through said second amplifier means resistor at its noninverting input and a high frequency response from said second amplifier means capacitor at its noninverting input; and means for combining and amplifying said first and second amplified signals to produce an output signal indicative of vertical reference and attitude wherein said output signal is provided to control means for controlling the vertical reference and attitude of the structure relative to the predetermined reference axis.

19. The apparatus of claim 18 wherein:
said apparatus further comprises n such amplification loops where n is a whole number and $n > 1$;
the outputs of the mth amplification loop are received by the $m+1$ amplification loop, where m is a whole number and $0 < m < n$; and
the outputs of the nth amplification loop are provided to said means for combining and amplifying.

* * * * *